United States Patent [19]

Jones

[11] Patent Number: 4,639,158

[45] Date of Patent: Jan. 27, 1987

[54] FLUID PRESSURIZED JOINT ASSEMBLY

[75] Inventor: Gerald M. Jones, Trimpley, England

[73] Assignee: National Research Development Corp., London, England

[21] Appl. No.: 627,295

[22] Filed: Jul. 2, 1984

[30] Foreign Application Priority Data

Jul. 8, 1983 [GB] United Kingdom ................. 8318576

[51] Int. Cl.[4] ............................ F16D 1/10; F16B 7/00

[52] U.S. Cl. ......................................... 403/31; 403/15; 72/283

[58] Field of Search ............... 403/15, 31, 16; 285/18; 72/283, DIG. 10, 481

[56] References Cited

U.S. PATENT DOCUMENTS

| | | | |
|---|---|---|---|
| 3,033,597 | 5/1962 | Miller | 403/15 |
| 3,097,003 | 7/1963 | Devé et al. | 403/15 |
| 3,212,313 | 10/1965 | Boyd et al. | 72/283 |
| 3,531,146 | 9/1970 | Blad et al. | 403/15 |
| 3,865,497 | 2/1975 | Bratt et al. | 403/15 |
| 4,173,725 | 11/1979 | Asai et al. . | |
| 4,176,981 | 12/1979 | Clapper et al. | 403/31 |
| 4,257,714 | 3/1981 | Hankosky et al. | 403/31 |
| 4,315,180 | 2/1982 | Kondo et al. . | |

FOREIGN PATENT DOCUMENTS

| | | | |
|---|---|---|---|
| 2501312 | 3/1981 | France . | |
| 969078 | 9/1964 | United Kingdom . | |
| 1380421 | 1/1975 | United Kingdom . | |
| 2014375 | 2/1978 | United Kingdom . | |
| 2033654 | 5/1980 | United Kingdom . | |
| 625899 | 9/1978 | U.S.S.R. | 403/15 |

*Primary Examiner*—Daniel C. Crane

*Attorney, Agent, or Firm*—Cushman, Darby & Cushman

[57] ABSTRACT

A joint assembly to make firm but easily releasable contact between two components, for instance a vibration generator of magnetostrictive or piezo-electric type, an an internal plug or mandrel for use in the drawing or draw-bending of metal tube. The assembly comprising first and second ring-shaped members to engage the respective components, and an intermediate member which is fixed to one of the members and in sliding contact with the other so as to define with that other a sealed chamber of variable volume. The chamber is connected in use to a source of pressurized fluid, and when filled with such fluid the chamber is expanded and the two components are urged into firm contact.

2 Claims, 1 Drawing Figure

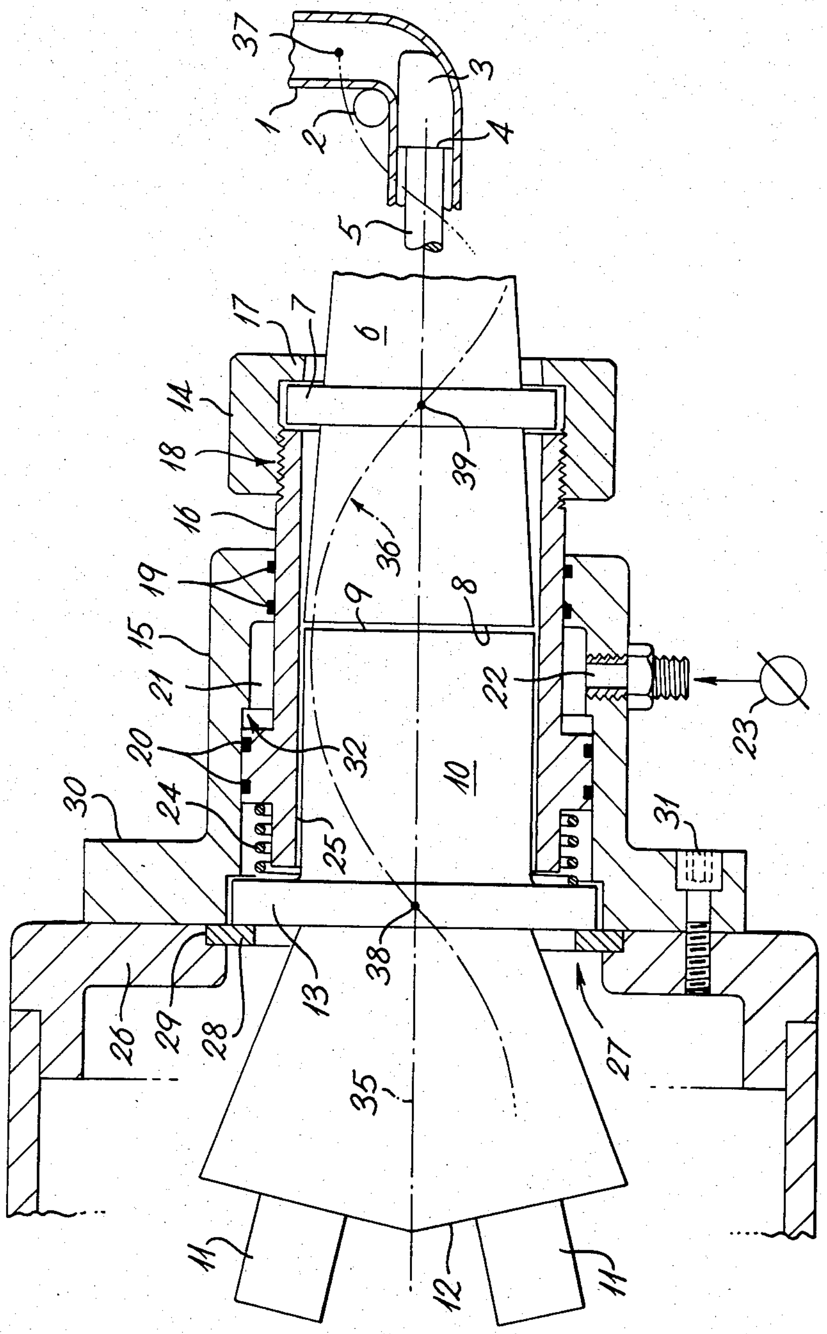
37
1
2
3
4
5
6
7
17
14
18
16
19
15
21
20
24
30
32
25
9
8
36
39
22
23
10
31
38
13
26
29
28
27
35
11
12
11

FLUID PRESSURIZED JOINT ASSEMBLY

BACKGROUND OF THE INVENTION

This invention relates to joint assemblies. It relates in particular to the technical field of vibratory metal forming, and to the connections that must be made between vibration generators and the forming tools that are to be vibrated by them. Such tools may include, for instance, plugs to which axial vibrations are to be applied in the course of plug tube drawing as described in UK Pat. No. 1,380,421 (UKPA No. 7579/71), and internal mandrels to which similar vibrations are to be applied in the course of tube bending as described in the specification of UK patent application No. 8318577.

It is customary for such a plug or mandrel to be mounted at one end of a long bar so that the bar passes with clearance along the full length of the unformed part of the tube that is being drawn or bent, and projects from the free end. The joint to which this invention relates will in practice be the one between that bar and one side or face of a vibratory horn or concentrator, the opposite face of which will carry suitable ultrasonic vibration generators. Such generators, for instance of magnetrostrictive or peizo-electric type, are well known in the art.

Such a joint must be simple to make and unmake, because in use those two operations will have to be made in succession each time the mandrel is changed. It is also essential that the joint should be a very positive one, so that the energy of the vibrators is transmitted to the tool with maximum efficiency, and that the joint should be repeatable so that that efficiency undergoes no change each time the joint is remade after being unmade. Practice has shown that a conventional joint, for instance a screw joint, tends not adequately to meet this combination of requirements, especially when the joint has to be made on the factory floor by staff unfamiliar with ultrasonic forming techniques.

SUMMARY OF THE INVENTION

The present invention arises from appreciating that by forming simple complementary surfaces upon the two parts to be joined, and providing a novel form of clamp to urge those two surfaces into intimate contact with each other, a greatly improved joint can be made. Accordingly to the invention a joint assembly for urging a first and vibratable component into firm contact with a second component to which vibration is to be transmitted comprises a first joint member to engage with one of the components, a second joint member to engage with the other component, an intermediate part which is fixed to one of the members and which makes flexible sealed contact with the other member and also defines a variable sealed chamber with that other member, and means for connecting the chamber to a source of pressurised fluid whereby a force may be created tending to cause relative sliding between the intermediate part and that other member, and thus to urge the two components together.

Each component may be of male form and present a peripheral flange, and each joint member may be of female form and present a groove to engage with the flange of the corresponding component. There may be an annular space between the two male components and at least one of the joint members, and the intermediate part may be sleeve-like in form and movable within that space.

The first joint member may engage with the second component to which the vibrations of the first component are to be transmitted.

A spring or like resilient device may be provided which is overcome whenever the chamber is pressurised, but which at other times acts to collapse the chamber and so relax the contact between the first and second components.

The second component may comprise a tool for use in a vibratory forming operation—for instance, a vibratable mandrel or plug for use in the vibratory drawing or bending or hollow workpieces—and the first component a vibratory horn or concentrator with means of attachment ot vibration-generating transducers.

BRIEF DESCRIPTION OF THE DRAWING

The accompanying drawing is an axial and partly diagrammatic section through a joint between a vibration concentrator and the bar upon which a bending mandrel is mounted.

DETAILED DESCRIPTION OF THE PREFERRED EMBODIMENT

Diagrammatically, the FIGURE shows hollow metal tubing 1 being bent around an external former 2 and an internal plug or mandrel 3. The mandrel is fixed to one end 4 of a bar 5, which is initially of constant section and which passes with clearance within the bore of the unbent part of the tube. Towards its other end the bar changes from constant section through a tapering part 6 of increasing section; a flange 7 is mounted on this part, and the end face 8 is flat and lies in a radial plane. The invention relates to the positive yet easily-disengaged joint that must be made between this face and the complementary flat face 9 presented by vibration horn or concentrator 10: vibration generators 11—for instance of piezo-electric or magnetostrictive type—are mounted on the angled and opposite end face 12 of this concentrator, on which a flange 13 is also mounted.

The joint comprises first and second annular joint members 14 and 15, and an intermediate sleeve 16. In use, as shown, a lip 17 on member 14 engages with flange 7, and there is a threaded connection 18 between member 14 and sleeve 16. "O"-rings 19 and 20 permit sliding but sealed contact between member 15 and sleeve 16 and a chamber 21, connected by an inlet 22 to a source 23 of pressurised fluid, is formed between the member and sleeve between the two sets of rings. A spring 24 is located around the unthreaded end 25 of the sleeve 16.

Reference 26 indicates part of the structure of the drawbending apparatus to which plug 3, bar 5 and horn 10 are to be fixed in use. Part 26 is formed with an aperture 27, through which flange 13 can just pass. To assemble the apparatus, the front end of horn 10 (that is to say, the end presenting face 9) is first passed through aperture 27 from the left-hand side (as shown in the FIGURE) until flange 13 lies just to the right-hand side of the aperture. A split ring 28 is then put in place in a recess 29, to prevent flange 13 passing back through the aperture. Sleeve 16 and part 15 are then assembled together, spring 24 is put in place on sleeve end 25, part 14 is put in place over flange 7 and threaded joint 18 is made, and mounting flange 30 of part 15 is presented to structure 26 to which it is secured by bolts 31. Faces 8 and 9 now confront one another, but are separated because of the action of spring 24 against flange 13 which urges sleeve 16 to the right-hand end of its travel in which the enlarged part of it (on which rings 20 are mounted) meets a shoulder 32 so that the size of chamber 21 is at a minimum. When source 23 is now energised, the fluid pressure so generated within chamber 21 overcomes the force of spring 24 and urges sleeve 16 to the left, carrying bar 5, 6 with it until faces 8 and 9 are urged into firm contact by a load related to the pressure in chamber 21, and flange 13 is urged into similar contact with split ring 28.

To disengage faces 8 and 9, all that is required is to de-energise source 23 so that the pressure in chamber 21 falls until the spring 24 again causes sleeve 16 to move to the right. Once the apparatus is assembled as has been decribed, and the operator wishes to connect a different bar end 6 to the horn 10, all that is necessary after turning off the source 23 is to undo joint 18, remove the existing bar end 6 and member 14, insert a new bar end and screw on another member 14—or indeed, the same one after disengagement from the original bar and mandrel—in its place. The source 23 is then re-energised.

Reference 35 indicated the common axis of the mandrel, bar and horn, and reference 36 indicates graphically the type of standing wave of resonant vibration that must be set up in use. As will be seen, such resonant vibration necessarily produces an amplitude aninode 37 at the tip of mandrel 3. It is also a practical necessity that the system is tuned so that a corresponding node 38 coincides with flange 13, to minimise dissipation of vibratory energy to the fixed structure of the apparatus, and also highly desirable that a similar node 39 coincides with flange 7 even through the "O"-rings 19 and 20 will greatly attenuate any transmission of vibratory energy to the fixed structure of the apparatus by the route flange 7—member 14—sleeve 16.

I claim:

1. A joint assembly comprising a first and vibratable component and a second component to which vibration is to be transmitted, said first and second components having a common axis of alignment, each of said first and second components being of male form and having a peripheral flange and means for urging said first and second components towards and into firm and direct contact with each other in a direction parallel to said common axis and comprising:

a first joint member separate from but engageable in a direction parallel to said common axis with one of said components;

a second joint member separate from but engageable in a direction parallel to said common axis with the other of said components;

each of said first and second joint members being of female form and including a groove adapted to engage with said flange of a corresponding component, each flange received in a respective groove of said first and second joint members, and there being an annular space between at least one of said first and second male components and at least one of said first and second joint members;

intermediate means being sleeve-like in form and separate from said first and second components and which is fixed to one of said joint members and movable within said annular space for making a flexible sealed contact with the other of said joint members, to completely define a sealed chamber of variable capacity with said other of said joint members; and means disposed on one of said first and second joint members for connnecting said chamber to a source of pressurized fluid, whereby a force is created when said chamber is pressurized, such force causing the joint members to engage with the respective components to cause relative sliding between said intermediate means and said other of said joint members, and thus to urge said first and second components toward one another into said firm and direct contact.

2. A joint assembly according to claim 1 in which said first joint member engages with said second component to which the said vibrations of said first component are to be transmitted.

* * * * *